United States Patent
Barzik et al.

(10) Patent No.: US 9,747,154 B2
(45) Date of Patent: Aug. 29, 2017

(54) ISOLATING HARDWARE AND NETWORK FAILURES IN A COMPUTING ENVIRONMENT

(71) Applicant: INTERNATIONAL BUSINESS MACHINES CORPORATION, Armonk, NY (US)

(72) Inventors: Zah Barzik, Rishon LeZion (IL); Lior Chen, Jerusalem (IL); Maxim Kalaev, Petach Tikva (IL); Rivka M. Matosevich, Zichron-Ya'acov (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 14/840,219

(22) Filed: Aug. 31, 2015

(65) Prior Publication Data
US 2017/0060655 A1   Mar. 2, 2017

(51) Int. Cl.
G06F 11/00   (2006.01)
G06F 11/07   (2006.01)

(52) U.S. Cl.
CPC ........ *G06F 11/079* (2013.01); *G06F 11/0709* (2013.01); *G06F 11/0751* (2013.01)

(58) Field of Classification Search
CPC . G06F 11/0709; G06F 11/0751; G06F 11/079
See application file for complete search history.

(56) References Cited

U.S. PATENT DOCUMENTS

| | | | | |
|---|---|---|---|---|
| 6,460,070 B1 * | 10/2002 | Turek | ............... | G06F 11/0709 709/202 |
| 8,031,634 B1 * | 10/2011 | Artzi | ............... | H04L 12/4641 370/254 |
| 8,381,033 B2 * | 2/2013 | Franklin | ............ | G06F 11/0712 714/25 |
| 8,856,589 B1 | 10/2014 | Glade et al. | | |
| 8,990,629 B2 * | 3/2015 | Salame | ............... | G06F 11/079 714/26 |
| 8,996,932 B2 * | 3/2015 | Singh | ............... | G06F 11/2294 714/47.3 |
| 9,495,234 B1 * | 11/2016 | Hamman | ............. | G06F 11/079 |
| 2003/0041095 A1 | 2/2003 | Konda et al. | | |
| 2008/0244532 A1 | 10/2008 | Arcese et al. | | |
| 2014/0351648 A1 | 11/2014 | Madani et al. | | |
| 2015/0089331 A1 | 3/2015 | Skerry et al. | | |
| 2016/0170848 A1 * | 6/2016 | Yang | ............... | G06F 11/2023 714/4.12 |

FOREIGN PATENT DOCUMENTS

| EP | 2216732 A1 | 9/2010 |
|---|---|---|
| WO | 2014063110 A1 | 4/2014 |
| WO | 2014162291 A1 | 9/2014 |

* cited by examiner

*Primary Examiner* — Marc Duncan
(74) *Attorney, Agent, or Firm* — Griffiths & Seaton PLLC

(57) ABSTRACT

Various embodiments for method for detecting network and hardware failures in a computing environment, by a processor device, are provided. In one embodiment, a method comprises isolating component failures by deploying a diagnostic code within an Operating System (OS) of both a first node and a connected appliance, and executing a set of diagnostic tests using the diagnostic code to determine if the source of the failure is within the first node or the connected appliance.

18 Claims, 3 Drawing Sheets

ISOLATING HARDWARE AND NETWORK FAILURES IN A COMPUTING ENVIRONMENT

BACKGROUND OF THE INVENTION

Field of the Invention

The present invention relates in general to computing systems, and more particularly, to various embodiments for detecting network and hardware failures in a computing environment.

Description of the Related Art

Today with modern technology, large volumes of data are storable on disk drives; these drives can exist as a solo entity, or as part of a broader make up within a larger storage environment, for example, as part of a Storage Area Network (SAN), or Software Defined Storage (SDS) systems, such as a Virtual Storage Area Network (VSAN). Typically, these storage environments comprise of appliances, or virtual appliances in SDS, built to store, transfer, and handle data. As the sheer volume of data in today's information-based society continues to increase, so too does the demands placed on communications and data processing infrastructures that serve to manipulate, transfer, and otherwise handle this data.

SUMMARY OF THE INVENTION

Various embodiments for detecting network and hardware failures in a computing environment, by a processor device, are provided. In one embodiment, a method comprises isolating component failures by deploying a diagnostic code within an Operating System (OS) of both a first node and a connected appliance, and executing a set of diagnostic tests using the diagnostic code to determine if the source of the failure is within the first node or the connected appliance.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
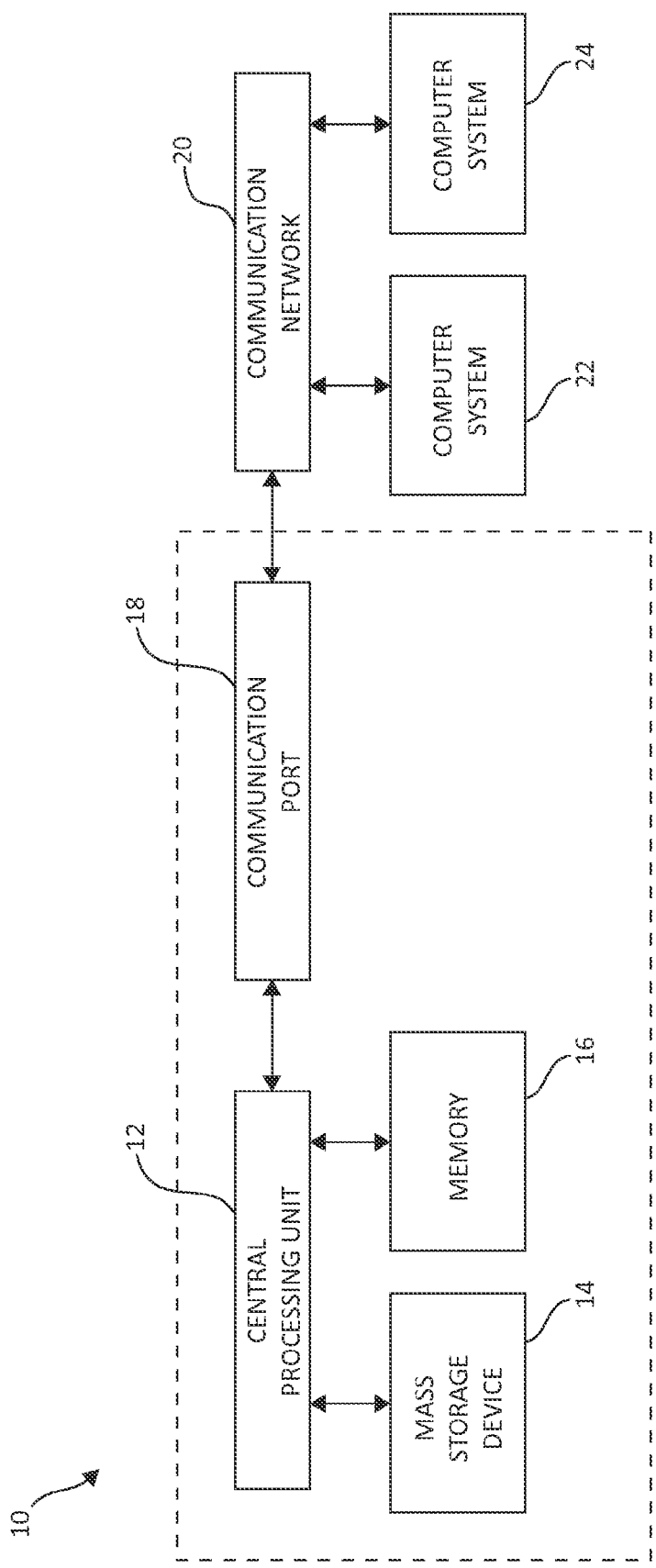
FIG. 1 illustrates a block diagram showing an exemplary hardware structure for effecting data routing management, in which aspects of the present invention may be realized.

Described embodiments, and illustrative Figures of a method for data routing management are to follow. In the interest of clarity, not all features of an actual implementation are described in this Specification. It will of course be appreciated by the skilled artisan, that in the development of any such actual embodiment, numerous implementation-specific decisions must be made to achieve the developers specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

Complex Storage Area Network (SAN) or Virtual Storage Area Network (VSAN) configurations enable large numbers of computing components, appliances, or virtual (software-defined) appliances, such as servers to access common storage via interconnection switches and cabling. The availability, integrity and recovery of these interconnections is critical to the reliable operations of the systems. Networks are often implemented with redundant routes, in conjunction with server multipath drivers allowing for failing commands to be recovered down alternate paths and avoiding outages and individual path failures.

A significant challenge with software-defined appliances is the shared responsibility of reliability between the software vendor and the hardware of an end user. The software vendor is accountable and responsible for the appliance software, and the end user is accountable and responsible for the hardware and its ecosystem. Accordingly, when errors or failures arise, determining the source side of the issue, whether within the software of the vendor or within the hardware of the end user, proves to be a challenging and indiscernible task.

Traditionally, to determine the source of a failure, appliance software diagnoses the hardware and network, and indicates the found errors. This method, however, is not sufficient, particularly in software-defined environments comprising virtual appliances. Because appliance software provides a diagnosis indicating found errors, and those diagnoses are based upon a solution executed within a code-complex virtual appliance, it is often indiscernible whether the errors are occurring within the software of the virtual appliance, or the Operating Software (OS) of the hardware system itself. The distinction is important, since a user, or "customer", is responsible for maintaining hardware including its OS, and a "vendor" is responsible for maintaining the appliance or virtual appliance. Consider the following example, in which there determines to be a communication loss between two nodes. The communication loss may originate due to an error within the virtual appliance (i.e. network settings/firewall rules), or the loss may originate due to firewall rules within a switch or other communication equipment in the user's environment.

In view of the foregoing, the mechanisms of the illustrated embodiments provide various solutions to the previous challenges for isolating hardware and network failures in a computing environment. These mechanisms include such functionality as creating a platform-agnostic diagnostic kit to diagnose and pinpoint the source of found errors and failures, as will be further described.

The mechanisms may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

Turning now to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 22, 24 and storage systems, which may include storage devices 14. The storage systems may include hard disk drive (HDD) devices, solid-state devices (SSD) etc., which may be configured in a redundant array of independent disks (RAID). The communication port 18, communication network 20, and other components not pictured for the sake of brevity but known to the skilled artisan may include such hardware components as fibre channel cabling, fibre channel ports, Host-Bus Adapters (HBAs), Converged Network Adapters (CNAs), network switches and switching components, and similar communications mechanisms known to one of ordinary skill in the art. Various aspects of the illustrated embodiments may be realized using one or more of these components as will be further described.

The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 22, 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
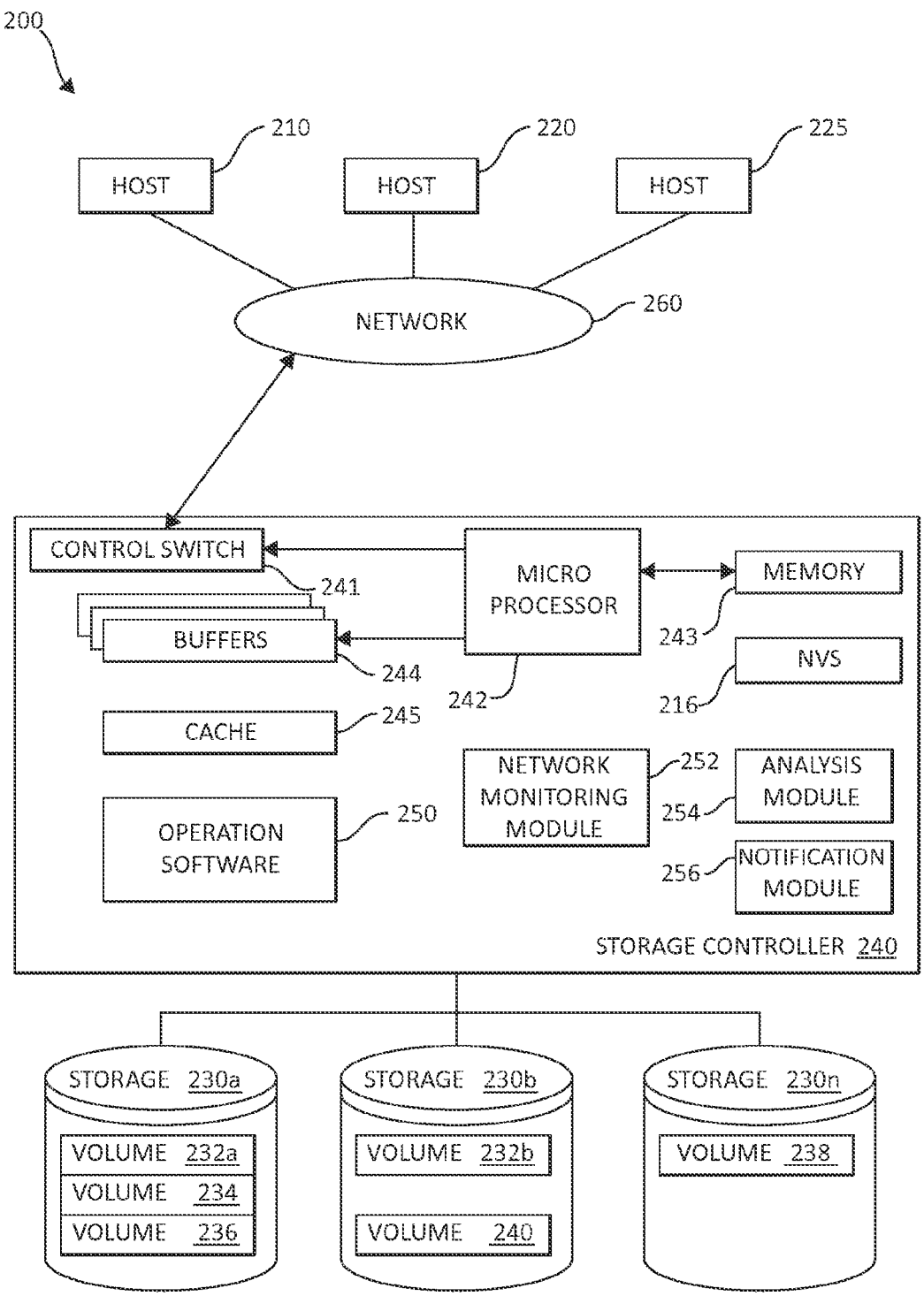
FIG. 2 illustrates an additional block diagram of an exemplary hardware structure, specifically portions of a complex SAN, again, in which aspects of the present invention may be realized.

FIG. 2 is an exemplary block diagram 200 showing a hardware structure of a data storage and management system (specifically, portions of a SAN 200) that may be used in the overall context of isolating hardware and network failures in accordance with the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200.

A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes and other network components known to one of ordinary skill in the art.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260. While one data connection between components (such as between storage 230 and storage controller 240, and network connection 260 and cluster hosts 210, 220, and 225) is shown for purposes of brevity, one of ordinary skill in the art will appreciate that a number of network connections, or "paths" may be found in a particular system or scenario in which data is transferred. These paths form the multipath architecture of storage networks in which the mechanisms of the present invention are concerned, among other aspects. In addition, alternate network paths appreciated by one of ordinary skill in the art may be found.

Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as a hard disk, magnetic tape, solid-state flash memory, or other non-volatile memory or any combination thereof. Additionally, Storage 230 may be physically comprised of one or more storage devices such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include operation software 250, a network monitoring module 242, an analysis module 254, and a notification module 256. The operation software 250, network monitoring module 242, analysis module 254, and notification module 256 may work in conjunction with each and every component of the storage controller 240, the hosts 210, 220, 225, and storage devices 230. The operation software 250, network monitoring module 242, analysis module 254, and notification module 256 may be structurally one complete module or may be associated and/or included with other individual modules. The operation software 250, network monitoring module 242, analysis module 254, and notification module 256 may also be located in the cache 245 or other components of portion 200.

The operation software 250, network monitoring module 242, analysis module 254, and notification module 256 may individually and/or collectively perform various aspects of the present invention as will be further described. For example, the operation software 250 may contain executable code for performing network test and evaluation functionality. The network monitoring module 252 may implement one or more monitoring processes. The network monitoring module 252 may monitor individual SAN components and/or data transmission between SAN components. For example, network monitoring module 252 may monitor data exchanges across particular data communication paths. The analysis module 254 may be used to aid in detecting hardware and network failures will be further described. Finally, the notification module 256 may send notification messages to other components in the portion 200 or elsewhere about various network status.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, and other components in the storage controller 240. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In view of the exemplary hardware structures depicted in FIGS. 1 and 2 previously, the mechanisms of the present invention may, as one of ordinary skill in the art will appreciate, be implemented and/or utilized in a wide variety of physical locations including, but not limited to Host-Bus Adapters (HBAs), Converged Network Adapters (CNAs), switch ports, storage ports, and the like.

Figure 3:
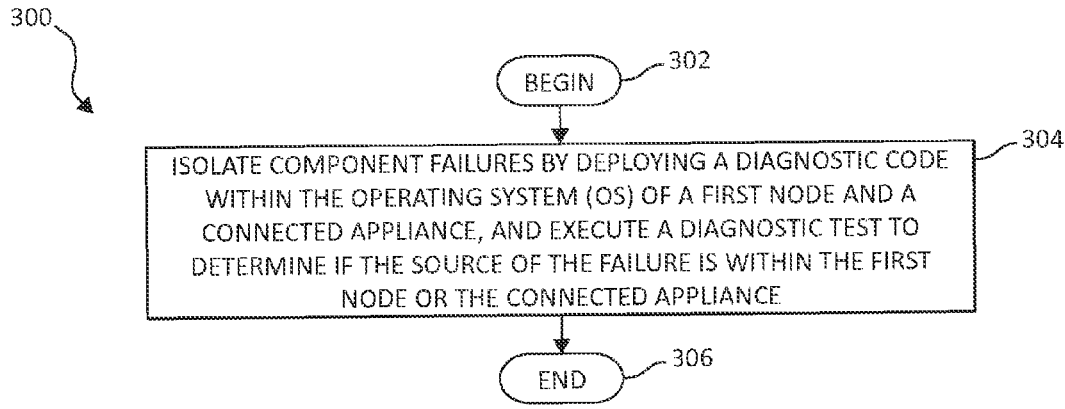
FIG. 3 illustrates a flow chart of a method for detecting network and hardware failures in a computing environment.

As aforementioned, the mechanisms of the illustrated embodiments, among other functionality, provide the ability to isolate the source side of a failure between a first node and a connected appliance, or virtual appliance. Continuing to FIG. 3, a method 300 of one embodiment of the present invention illustrates the methodologies herein. Beginning at step 302, component failures are isolated by deploying a diagnostic code within the OS of a first node, and a connected appliance, and a diagnostic test is executed to determine if the source of the failure is within the first node or the connected appliance (step 304). The method ends (step 306).

In one embodiment, a flexible diagnostic kit is created that is platform-agnostic, that is, the diagnostic kit is able to execute on a wide variety of operating systems (typically supplied by a customer), in addition to an appliance or virtual appliance (typically supplied by a vendor). The diagnostic kit contains diagnostic code embodied within that relies on basic OS code built into any readily available OS that may be running on the first node. As the diagnostic kit executes, if an error or failure is detected, the diagnostic kit may be re-executed on a freshly installed version of the OS to attempt to reproduce the found error. If, when re-executed, the diagnostic kit detects the same error on a freshly installed OS environment, it is perspicuous that the source of the failure is within the customer, or user-side, of the environment. Similarly, the diagnostic kit may indicate the failure to be within the connected appliance or virtual appliance, in which responsibility then falls on the vendor of the appliance or virtual appliance.

Figure 4:
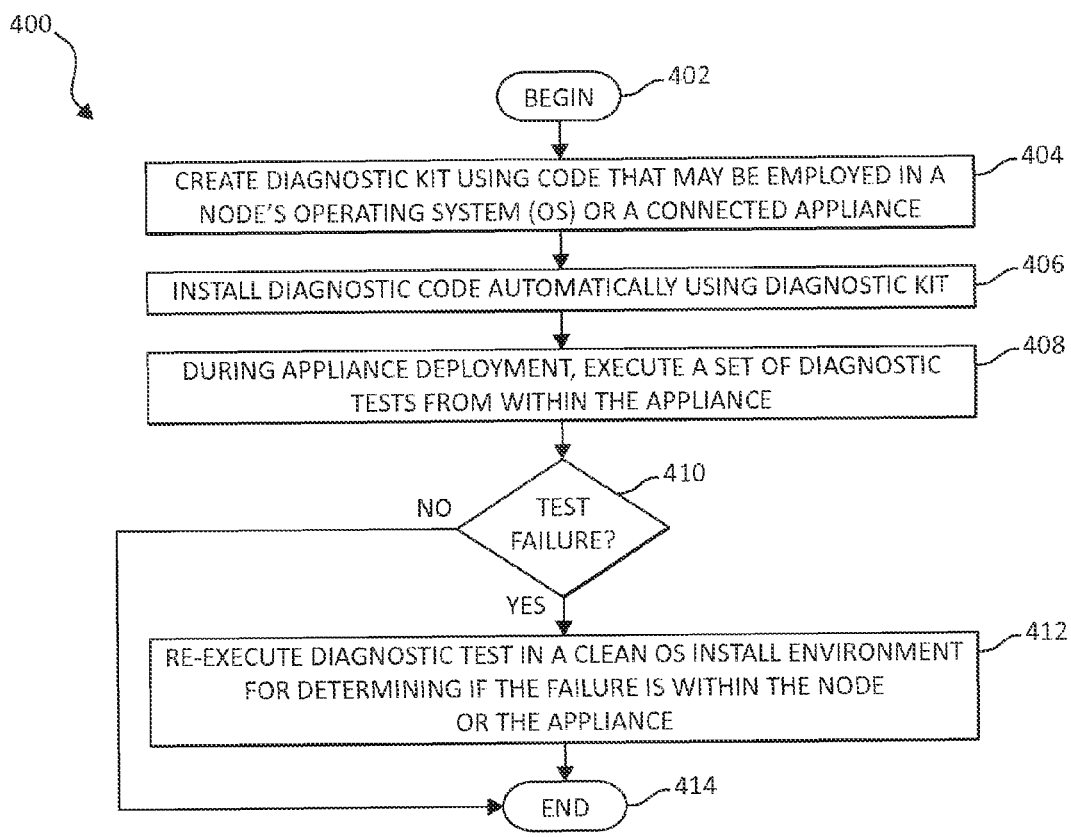
FIG. 4 illustrates an additional flow chart of a method for detecting network and hardware failures in a computing environment.

FIG. 4 illustrates a method 400 for implementing the mechanisms of the present invention into a computing environment. Beginning at 402, a platform-agnostic diagnostic kit containing diagnostic code is embodied upon a first node, a connected appliance, or both (step 404). In one embodiment, the OS containing the diagnostic kit may be deployed automatically through a deployment kit included with a connected appliance or virtual appliance (step 406). In another embodiment, the diagnostic kit may be embodied upon any computer readable storage medium as will be further described. During the deployment of the appliance or virtual appliance, a set of diagnostic tests are executed using the diagnostic code, from within the appliance (step 408). If an error or failure is not indicated by the set of diagnostic tests (step 410), the method ends (step 414). If an error or failure is detected by the set of diagnostic tests (step 410), the set of diagnostic tests is then re-executed in a freshly or "cleanly" installed OS for determining if the failure originates within the node's OS environment, or originates within the connected appliance or virtual appliance (step 412). Here again, if the set of diagnostic tests, re-executed within a cleanly installed version of the OS, indicates the same error or failure, it is perspicuous that the source of the failure is within the customer, or user-side, of the environment. Similarly, the diagnostic kit may indicate the failure to be within the connected appliance or virtual appliance, in which responsibility then falls on the vendor of the appliance or virtual appliance. The method ends (step 414).

In another embodiment, if an error is found to be within the first node or first node's OS environment, a diagnostic shell and set of tools may be included for further aid in failure investigation. A diagnostic script may further be included that may be read and analyzed to enhance the user's confidence in the validity of the overall diagnostic results.

Here again, the diagnostic kit containing the diagnostic code may be executed from within a supplied appliance automatically, the code being embedded within the supplied appliance, or may be executed from within a generic OS using any applicable user interface (UI).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for detecting network and hardware failures in a computing environment, by a processor device, comprising:
   isolating component failures by deploying a diagnostic code within an Operating System (OS) of both a first node and a connected appliance, and executing a set of diagnostic tests using the diagnostic code to determine if the source of the failure is within the first node or the connected appliance; and
   executing the set of diagnostic tests during the deployment of the connected appliance, the set of diagnostic tests configured to execute from within the connected appliance.

2. The method of claim 1, further including implementing a platform agnostic diagnostic kit containing the diagnostic code, the diagnostic kit configured to execute on one of the first node and the connected appliance.

3. The method of claim 2, wherein the diagnostic kit containing the diagnostic code is deployed into the OS automatically, without user intervention.

4. The method of claim 2, wherein the diagnostic kit containing the diagnostic code is deployed into the OS manually by a user, using a User Interface (UI).

5. The method of claim 1, further including, if the executed set of diagnostic tests indicates a failure, re-executing the set of diagnostic tests on a freshly installed version of the OS, and comparing results of the set of diagnostic tests executed on the freshly installed version of the OS to the results of the set of diagnostic tests executed on the first node or connected appliance under test.

6. The method of claim 1, wherein the connected appliance is a virtual appliance.

7. A system for detecting network and hardware failures in a computing environment, comprising:
   a first node,
   a connected appliance, and
   a processor device, wherein the processor device:
      isolates component failures by deploying a diagnostic code within an Operating System (OS) of both the first node and the connected appliance, and executes a diagnostic test using the diagnostic code to determine if the source of the failure is within the first node or the connected appliance; and
      executes the set of diagnostic tests during the deployment of the connected appliance, the set of diagnostic tests configured to execute from within the connected appliance.

8. The system of claim 7, wherein the processor device implements a platform agnostic diagnostic kit containing the diagnostic code, the diagnostic kit configured to execute on one of the first node and the connected appliance.

9. The system of claim 8, wherein the diagnostic kit containing the diagnostic code is deployed into the OS automatically, without user intervention.

10. The system of claim 8, wherein the diagnostic kit containing the diagnostic code is deployed into the OS manually by a user, using a User Interface (UI).

11. The system of claim 7, wherein the processor device, if the executed set of diagnostic tests indicates a failure, re-executes the set of diagnostic tests on a freshly installed version of the OS, and compares results of the set of diagnostic tests executed on the freshly installed version of the OS to the results of the set of diagnostic tests executed on the first node or connected appliance under test.

12. The system of claim 7, wherein the connected appliance is a virtual appliance.

13. A computer program product for detecting network and hardware failures in a computing environment, by a processor device, the computer program product embodied on a non-transitory computer-readable storage medium having computer-readable program code portions stored therein, the computer-readable program code portions comprising:
   a first executable portion that isolates component failures by deploying a diagnostic code within an Operating System (OS) of both a first node and a connected appliance, and executes a diagnostic test using the diagnostic code to determine if the source of the failure is within the first node or the connected appliance; and
   a second executable portion that executes the set of diagnostic tests during the deployment of the connected appliance, the set of diagnostic tests configured to execute from within the connected appliance.

14. The computer program product of claim 13, further including a third executable portion that implements a platform agnostic diagnostic kit containing the diagnostic code, the diagnostic kit configured to execute on one of the first node and the connected appliance.

15. The computer program product of claim 14, wherein the diagnostic kit containing the diagnostic code is deployed into the OS automatically, without user intervention.

16. The computer program product of claim 14, wherein the diagnostic kit containing the diagnostic code is deployed into the OS manually by a user, using a User Interface (UI).

17. The computer program product of claim 13, further including a third executable portion that, if the executed set of diagnostic tests indicates a failure, re-executes the set of diagnostic tests on a freshly installed version of the OS, and compares results of the set of diagnostic tests executed on the freshly installed version of the OS to the results of the set of diagnostic tests executed on the first node or connected appliance under test.

18. The computer program product of claim 13, wherein the connected appliance is a virtual appliance.

* * * * *